United States Patent
Damera-Venkata (10) Patent No.: US 9,911,141 B2
(45) Date of Patent: Mar. 6, 2018

(54) CONTEXTUAL ADVERTISEMENTS WITHIN MIXED-CONTENT PAGE LAYOUT MODEL

(75) Inventor: Niranjan Damera-Venkata, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1253 days.

(21) Appl. No.: 12/848,182

(22) Filed: Aug. 1, 2010

(65) Prior Publication Data
US 2012/0030033 A1 Feb. 2, 2012

(51) Int. Cl.
*G06Q 30/00* (2012.01)
*G06Q 30/02* (2012.01)

(52) U.S. Cl.
CPC ..... *G06Q 30/0275* (2013.01); *G06Q 30/0276* (2013.01); *G06Q 30/0277* (2013.01)

(58) Field of Classification Search
CPC .............. G06Q 30/0277; G06Q 30/0276
USPC ....................................... 705/14.73
See application file for complete search history.

(56) References Cited

U.S. PATENT DOCUMENTS

| 2002/0116418 A1* | 8/2002 | Lachhwani | G06F 17/212 715/244 |
| 2003/0046161 A1* | 3/2003 | Kamangar | G06Q 30/02 705/14.6 |
| 2004/0255245 A1* | 12/2004 | Yamada | G06F 17/212 715/246 |
| 2006/0074746 A1* | 4/2006 | Kline | G06Q 30/02 705/14.1 |
| 2007/0083429 A1 | 4/2007 | Kraft | |
| 2007/0255616 A1 | 11/2007 | Gjerstad et al. | |
| 2007/0288454 A1* | 12/2007 | Bolivar | G06Q 30/02 |
| 2009/0317019 A1 | 12/2009 | Puliur | |
| 2010/0017704 A1 | 1/2010 | Jaffe | |
| 2012/0204100 A1* | 8/2012 | Damera-Venkata | G06F 17/211 715/244 |

FOREIGN PATENT DOCUMENTS

CN 101324890 12/2008

* cited by examiner

Primary Examiner — John Van Bramer
Assistant Examiner — Stacie D Gatling
(74) Attorney, Agent, or Firm — Michael A. Dryja (57) ABSTRACT

One or more text blocks, one or more images, and one or more contextual advertisements related to the text blocks are input into a mixed-content page layout model. One or more pages are generated by the mixed-content page layout model such that the text blocks, the images, and the contextual advertisements are displayed on the pages. For each contextual advertisement, a dynamic weight to a particular text block is determined. The mixed-content page layout model uses the dynamic weight for a contextual advertisement in determining where the advertisement is displayed within the pages in relation to the particular text block.

17 Claims, 6 Drawing Sheets

CONTEXTUAL ADVERTISEMENTS WITHIN MIXED-CONTENT PAGE LAYOUT MODEL

BACKGROUND

Mixed-content page layout is the process of laying out different types of content on a printed or an electronically displayed page in an aesthetically pleasing manner. The types of content can include text as well as images. Traditionally, the mixed-content page layout process has been performed manually. For example, publishers of magazines and newspapers usually employ graphic designers that determine the best way in which lay out text and images on pages in an aesthetically pleasing manner, while at the same time adhering to general layout guidelines for their particular magazines or newspapers. As another example, more amateur users may select a predesigned template to lay out their mixed content on pages as diverse as blogs, newsletters, and so on.

DETAILED DESCRIPTION

As noted in the background section, mixed-content page layout is the process of laying out different types of content on a printed or an electronically displayed page in an aesthetically pleasing manner. Whereas traditionally the mixed-content page layout process has been performed manually, more recently automated approaches have been developed for achieving mixed-content page layout. For example, such automated approaches include probabilistic mixed-content page layout models. Such probabilistic models can receive as input blocks of text and images, as well as a number of generalized predesigned templates. A probabilistic model selects which template to use for each page, modifies the template as appropriate, and automatically populates the template with the input content without user interaction.

However, such probabilistic mixed-content page layout models are not necessarily well equipped to accommodate the placement of contextual advertisements on pages alongside text blocks and images. A contextual advertisement is an advertisement that is related in some way to a block of text being placed on a page; for example, a contextual advertisement may be related to a keyword found in the text block. An advertisement differs from a non-advertisement image in a number of ways. First, whereas an image may be able to be resized by a mixed-content page layout model as needed, in general an advertisement cannot, because usually the advertiser has paid for a specific size of advertisement.

Second, the relatedness between a contextual advertisement and a block of text is dynamic, whereas the relatedness between a non-advertisement and a block of text is static. For instance, an image may be a figure referred to by a particular block of text. It can be said that each such image has the same relatedness to its corresponding block of text, such as "absolutely related," "maximally related," and so on. By comparison, some contextual advertisements may be more related to their corresponding blocks of texts than other advertisements are. As just one example, an advertisement for tourism in the Bahamas may be considered as more related to a corresponding block of text describing the Bahamas than an advertisement for tourism in the Caribbean generally.

The relatedness between an image or a contextual advertisement and its corresponding block of text should be at least implicitly taken into account by a probabilistic mixed-content page layout model in determining where to place the image or advertisement in relation to the block of text on a given page. For example, an image that is a figure referred to by a particular block of text may be located as close to the text block as possible, and desirably on the same page. By comparison, a contextual advertisement that is more related to a particular block of text may be located closer to the text block than another contextual advertisement that is less related to this block of text.

Examples of the disclosure thus provide for the modification of an existing probabilistic mixed-content page layout model so that the model can take into account the unique characteristics of contextual advertisements when laying out pages. That is, examples provide for a probabilistic mixed-content page layout model that generates pages including contextual advertisements related in a dynamic way to corresponding blocks of text. As such, contextual advertisements can advantageously be placed on mixed-content pages using a probabilistic model that performs page layout without user interaction.

Figure 1:
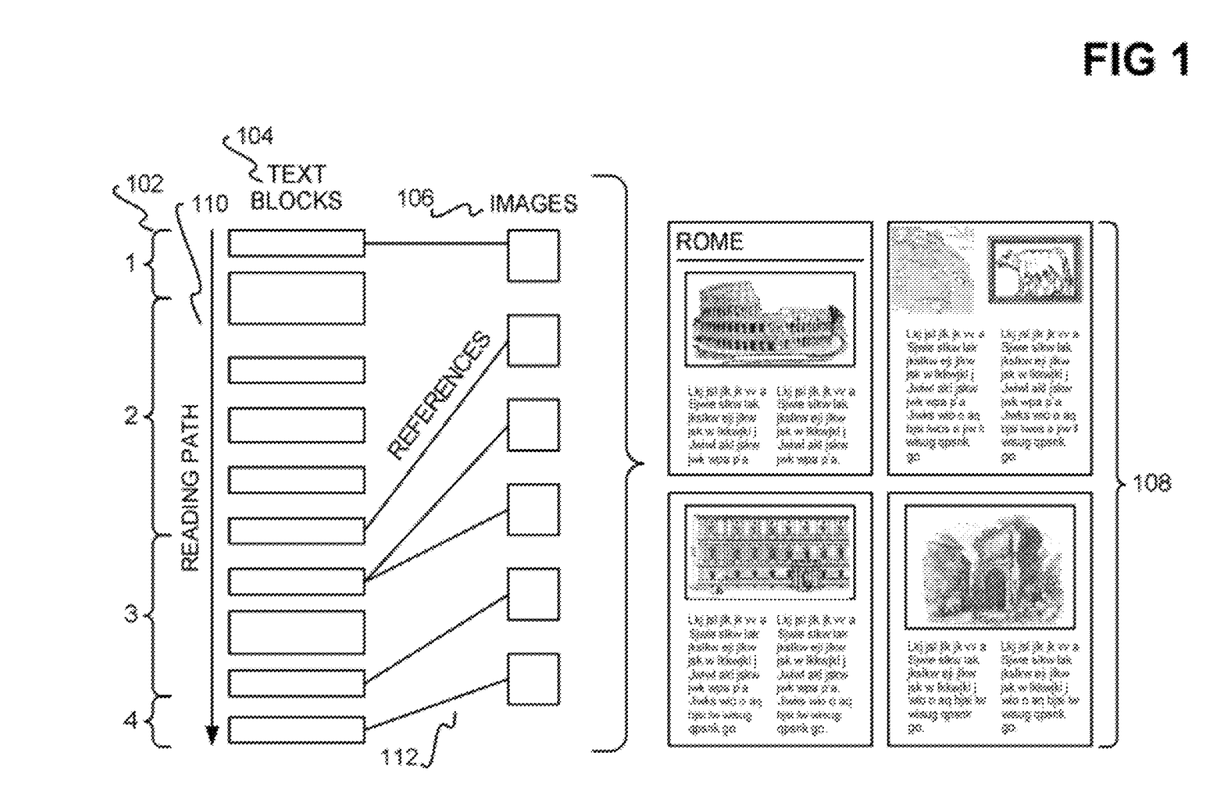
FIG. 1 is a diagram of a representative example of how a probabilistic mixed-content page layout model generally works, in relation to which embodiments of the disclosure may be practiced.

FIG. 1 shows a representative example of how a probabilistic mixed-content page layout model generally works, in relation to which examples of the disclosure may be practiced. Mixed content including text blocks 104 and images 106, such as figures, are to be laid out on pages 108. Each image 106 corresponds to a particular text block 104, as indicated by references 112. The text blocks 104 are provided in a particular order 110 corresponding to the reading path in which the blocks 104 should be presented to the user on the pages 108. Each image 106 is to be placed as close to its corresponding text block 104, and desirably after the text block 104 is presented on a page 108, as well as desirably on the same page 108 as the text block 104.

A probabilistic mixed-content page layout model thus processes the text blocks 104 starting at the first text block 104, and lays out successive pages 108 that include the text blocks 104 and their associated images 106. For each page, the model selects which of a number of generalized predesigned templates to use in a probabilistic manner, based on the text blocks 104 and their associated images 106, and adjusts and then populates the selected template with some of the text blocks 104 and the images 106. Reference number 102 thus points to which text blocks 104 and which images 106 are located on which pages 108.

A page is considered a printed page or an electronically displayed page. A printed page has a size no greater than the size of a medium sheet, such as paper, on which the page is printed. In this case, the images 106 are static images. By comparison, an electronically displayed page has a size no greater than the size of the display on which the page is displayed, so that each page does not extend over multiple sheets. As such, a page is completely displayable on the display, and scrolling is unnecessary to view the page completely on the display. Furthermore, in this case the images 106 can include both static images as well as moving images—i.e., video that may or may not include audio.

Figure 2:
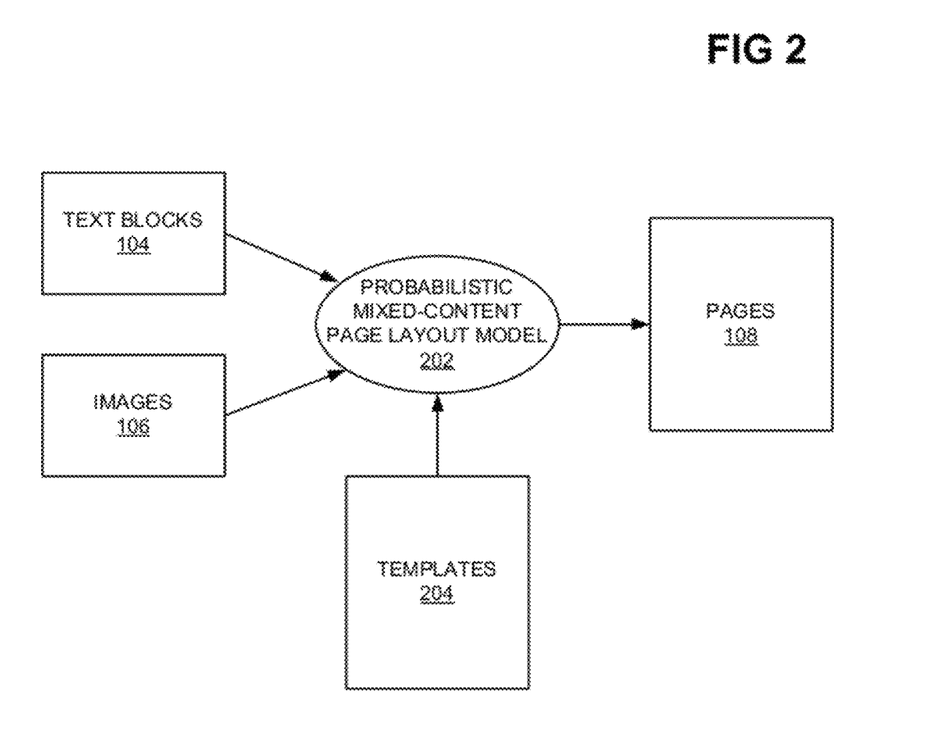
FIG. 2 is a diagram of the input and output of a probabilistic mixed-content page layout model, in relation to which examples of the disclosure may be practiced.

FIG. 2 shows the input and output of a probabilistic mixed-content page layout model 202, in relation to which examples of the disclosure can be practiced. The probabilistic model 202 receives as input a number of generalized predesigned templates 204 that can be modified as appropriated by the model 202. The templates 204 are typically provided to the model 202 before the model 202 is actually used to generate pages on which mixed content has been laid out.

The probabilistic mixed-content page layout model 202 also receives as input one or more text blocks 104 and one or more images 106. The text blocks 104 are provided in a given order corresponding to a reading path in which the blocks 104 should be presented on the pages 108. The images 106 are each associated with a text block 104. Once the generalized predesigned templates 204 have been input into the probabilistic model 202, and after the text blocks 104 and the images 106 have been input as well, the model 202 generates the pages 108 with the text blocks 104 and the images 106 laid out on them without any user interaction.

The probabilistic mixed-content page layout model 202 that is employed, modified, and/or extended by examples of the disclosure can be the probabilistic mixed-content page layout model that is described in two presently pending patent applications. The first patent application is the PCT patent application entitled "probabilistic methods and systems for preparing mixed-content document layouts," filed on Oct. 20, 2009, and assigned patent application number PCT/US2009/061320. The second application is the PCT patent application entitled "methods and systems for preparing mixed-content documents," filed on Oct. 28, 2009, and assigned patent application number PCT/US2009/062288.

In general, the probabilistic mixed-content page layout model 202 is a page layout model in that it lays out content on pages 108. The model 202 is a mixed-content model in that the content laid out on the pages 108 is mixed content including at least text blocks 104 and images 106 (as well as contextual advertisements, as described below). The model 202 is a probabilistic model in that it uses probabilistic methods in determining which text blocks 104 and which images 106 (as well as which contextual advertisements) are displayed on each page 108, and in determining how these mixed types of content are displayed on each page 108.

The model 202 is further a probabilistic model in that it is a priori non-deterministic. That is, the generalized predesigned templates 204 are probabilistic page layout templates. The templates 204 do not absolutely specify where a given type of content is to be placed on a page 108. Rather, the templates 204 are more generalized, and indicate in effect general guidelines as to how various types of content should be placed on a page 108. The probabilistic aspect of a page layout template 204 results from manipulation of the general guidelines in content placement resulting in a greater or a lesser probability as to how aesthetically pleasing a result page layout using the template 204 as a guide will likely be.

For example, depending on one or more particular text blocks 104 and one or more particular images 106 to be placed on a given page 108, a given page layout template 204 may provide general guidelines as to how much the images 106 can be resized, and how much the distance between the text blocks 104 and the images 106 can be adjusted. The probabilistic mixed-content page layout model 202 then adjusts these parameters based on the actual text blocks 104 and images 106 to be placed on the page 108. The resulting laid-out page 108 may then have a probabilistic score corresponding to how aesthetically pleasing the page 108 is.

This process is selectively repeated for each page 108 using a variety of different (or the same) templates 204. Ultimately, the probabilistic missed-content page layout model may select page layout template(s) 204 for the pages 108 that result in the highest overall probabilistic score for the pages 108 as a group. Therefore, for a given page 108, the probabilistic score for the ultimately selected template 204 may be less than the probabilistic score if a different template 204 were selected. However, if the total probabilistic score of all the pages 108 is nevertheless higher, then the latter template 204 may not be selected for the given page 108.

Figure 3:
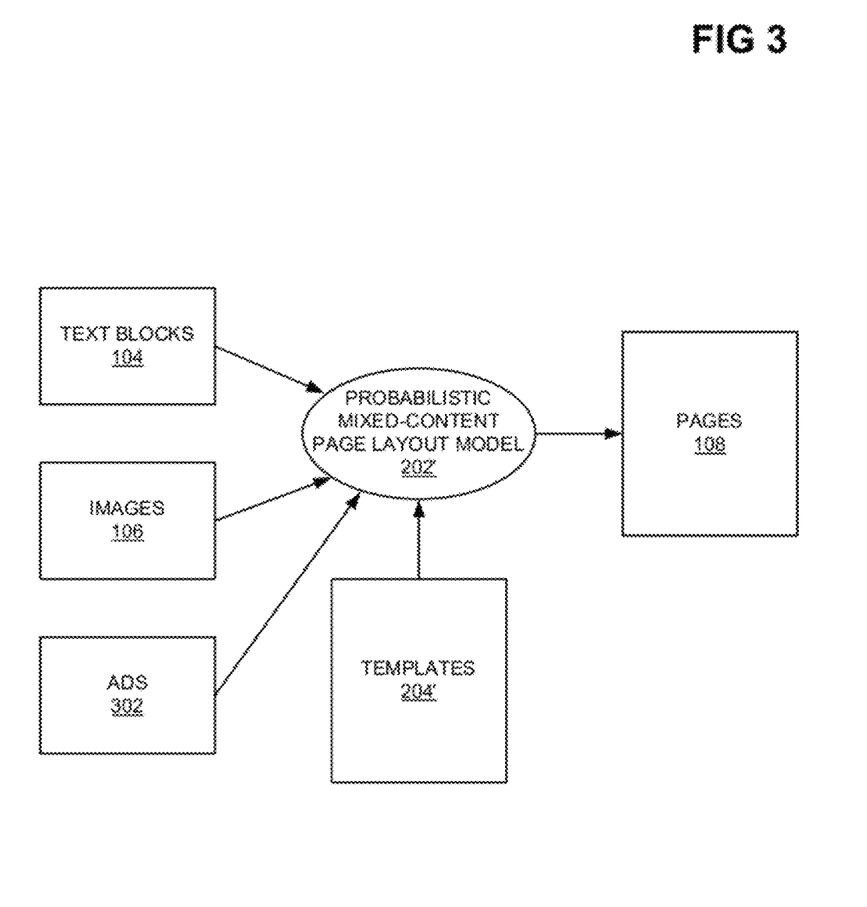
FIG. 3 is a diagram of the input and output of a probabilistic mixed-content page layout model that accommodates contextual advertisements, according to an example of the disclosure.

FIG. 3 shows the input and output of a probabilistic mixed-content page layout model 202', according to an example of the disclosure. The probabilistic model 202' differs from the probabilistic model 202 that has been described in that the model 202 can be modified or extended to yield the model 202'. The model 202' is designed to receive as input one or more contextual advertisements 302, in addition to the text blocks 104 and the images 106. Furthermore, the generalized predesigned templates 204' are modified versions of the templates 204, so that they are receptive to the inclusion of the contextual advertisements 302 in addition the text blocks 104 and the images 106. However, like the templates 204, the templates 204' are probabilistic page layout templates, as has been described above.

As in FIG. 2, the text blocks 104 are provided in a given order corresponding to a reading path in which the blocks 104 should be presented on the pages 108, and each image 106 is associated with one of the text blocks 104. The contextual advertisements 302 are also each associated with one of the text blocks 104. However, the manner by which the contextual advertisements 302 are associated with the text blocks 104 is different than the manner in which the images 106 are associated with the text blocks 104.

In particular, the images 106 are each associated with a corresponding text block 104 with a common static weight. This common static weight indicates that each image 106 has the same relatedness to its corresponding text block 104 as every other image 106 does. Stated another way, no image 106 is more (or less) related to its corresponding text block 104 than any other image 106.

By comparison, the contextual advertisements 302 are each associated with a corresponding text block 104 with a dynamic weight. The dynamic weights of the contextual advertisements 302 can be different from one another. For example, on a scale from zero to one, where zero indicates no relatedness and one indicates maximum relatedness, one contextual advertisement 302 may be related to its corresponding text block 104 with a dynamic weight of 0.4, whereas another advertisement 302 may be related to its corresponding text block 104 with a dynamic weight of 0.2. This means that the former advertisement 302 is more related to its corresponding text block 104 than the latter advertisement 302 is. It is noted that on the scale from zero to one used for the dynamic weights, the common static weight may be one.

The dynamic weights of the contextual advertisements 302 and the common static weight of the images 106 are used by the probabilistic mixed-content page layout model 202' in determining where each contextual advertisement 302 or image 106 is to be displayed within the pages 108 in relation to its corresponding text block 104. For example, assume a first contextual advertisement 302 has a dynamic weight of 0.8, and a second contextual advertisement 302 has a dynamic weight of 0.5. This means that it is more important to locate the first advertisement 302 close to its corresponding text block 104 than it is to locate the second advertisement 302 close to its corresponding text block 104.

The dynamic weights of the contextual advertisements 302 can be determined in accordance with one or more of a number of different approaches. Four example approaches are described herein. First, the relevance of a contextual advertisement 302 to a corresponding text block 104 may be considered in determining the dynamic weight. For example, an advertisement 302 about Russia may have a higher dynamic weight for a text block 104 that mentions Russia in passing in text that is primarily about Europe, than for a text block 104 that mentions Russia repeatedly in text that is primarily about Russia.

Second, the relatedness between a contextual advertisement 302 and one or more characteristics of a user that is to view the pages 108 including a text block 104 may be considered in determining the dynamic weight. For example, it may be known that the user for whom the pages 108 are being generated is a baseball fan. An advertisement 302 about a baseball game may thus have a higher dynamic weight for a text block 104 that discusses sports than an advertisement 302 about a football game does.

Third, the relatedness between a contextual advertisement 302 and a location of the user that is to view the pages 108 including a text block 104 may be considered in determining the dynamic weight. For example, it may be known that the user for whom the pages 108 are being generated is a football fan, who is from Minnesota. An advertisement 302 about a football game between the Minnesota Vikings and the Dallas Cowboys may thus have a higher dynamic weight for a text block 104 that discusses football than an advertisement 302 about a football game between the Arizona Cardinals and the Dallas Cowboys does.

Fourth, the bid price that an advertiser of a contextual advertisement 302 has bid for a keyword found in a text block 104 may be considered in determining the dynamic weight. For example, a first advertiser may have bid twenty dollars for its advertisement 302 to be placed near a text block 104 having a particular keyword, whereas a second advertiser may have bid ten dollars for its advertisement 302 to be placed near this same text block 104. As such, the first advertiser's advertisement 302 may have a higher dynamic weight than the second advertiser's advertisement 302 does.

The probabilistic mixed-content page layout model 202' thus processes the text and the images 106 in generating the pages 108 using the generalized predesigned templates 204', and the contextual advertisements 302 in the same manner that the probabilistic model 202 of FIG. 2 does using the templates 204, as has been described above. However, the model 202' also processes the contextual advertisements 302 as well. The contextual advertisements 302 are processed by the model 202' in a similar manner as the images 106 are processed. The difference is that whereas the latter have a common static weight, the former have dynamic weights that can be different for different contextual advertisements 302. In this respect, then, it is said that model 202' extends or modifies the model 202 so that contextual advertisements 302 can be processed and laid out on the pages 108.

There can be a further difference between the images 106 and the contextual advertisements 302, however, besides their weights. In particular, the probabilistic mixed-content page layout model 202' may be able to resize the images 106 as appropriate to provide for a higher probabilistic score as to how aesthetically pleasing a page 108 is. By comparison, in one example, the advertisements 302 are not resizable. This is because advertisers typically pay for placement of their advertisements 302 in part based on the size of the advertisements 302, such that the advertisements 302 cannot be resized. Therefore, the probabilistic mixed-content page layout model 202' takes into account that the contextual advertisements 302 cannot be resized when placing the advertisements 302 on the pages 108.

Figure 4:
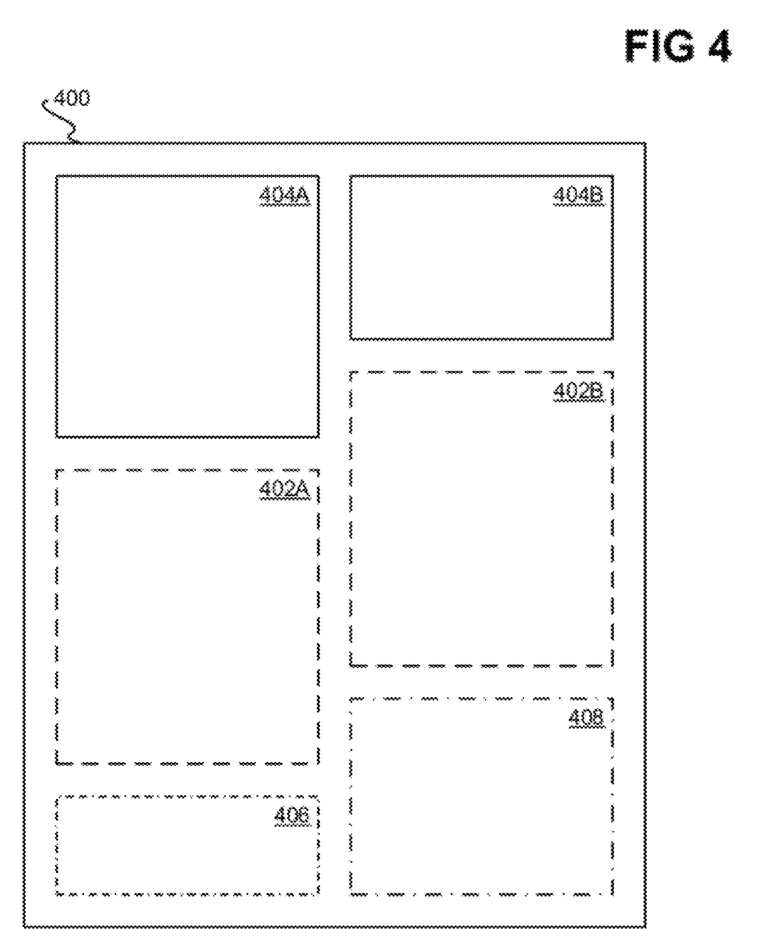
FIG. 4 is a diagram of a probabilistic page layout template, according to an example of the disclosure.

FIG. 4 shows an example generalized predesigned template 400 that can be used as one of the templates 204' by the probabilistic mixed-content page layout model 202', according to an example of the disclosure. The template 400 includes two text regions 402A and 402B, collectively referred to as the text regions 402. The template 400 includes two image regions 404A and 404B, collectively referred to as the image regions 404. The template 402 includes an advertisement region 406, and also a generalized region 408.

The regions 402, 404, 406, and 408 can vary in number, position, and size as compared to as is shown in FIG. 4, for generalized predesigned templates 204' other than the template 400. Furthermore, the probabilistic mixed-content page layout model 202' may be able to vary the sizes of the regions 402, 404, 406, and 408, and/or the spacing between adjacent regions 402, 404, 406, and 408, to provide for a higher probabilistic score indicating how aesthetically pleasing the resulting laid-out page 108 is. It is noted, though, whereas the size of the region 406 may be modified, the contextual advertisement 302 to be placed in the region 406 cannot itself be changed in size. For example, for a particular size of an advertisement 302, the region 406 can be made bigger or smaller to accommodate the advertisement 302, but the region 406 cannot be made smaller than the size of the advertisement 302 itself.

The regions 402 are for text blocks 104, such that images 106 and contextual advertisements 302 cannot be assigned to the regions 402. Likewise, the regions 404 are for images 106, such that text blocks 104 and contextual advertisements 302 cannot be assigned to the regions 404. However, more generally, each region 402 and 404 can be considered as a text-or-image region that is only for text blocks 104 or images 106, and not for contextual advertisements 302. The region 406 is just for advertisements 302, and not for text blocks 104 or images 106.

By comparison, the region 408 is a generalized region that can accommodate a text block 104, an image 106, or a contextual advertisement 302, depending on the needs of the probabilistic mixed-content page layout model 202'. In general, if more contextual advertisements 302 are to populate the page 108 having the template 400' than there are regions 406 for such advertisements 302, then the model 202 can place the extra advertisements 302 in the region 408.

However, if there are no such extra advertisements 302, than the region 408 can instead be dedicated for text blocks 104 or images 106, as determined by the model 202.

The point of having such a generalized region 408 thus permits a lesser number of generalized predesigned templates 204' to be input into the probabilistic mixed-content page layout model 202. For example, it may be determined that in the typical case, there will be no more than one or two contextual advertisements 302 on a page 108. Therefore, for each different type of template 204', there can be three versions: a first version with no regions 406 for advertisements 302; a second version with one region 406 for advertisements 302; and a third version with two regions 406 for advertisements 302. For the unusual case where there are more than two contextual advertisements 302 on a page 108, the third version also includes a generalized region 408, so that fourth, five, et seq., versions are unnecessary.

Therefore, what has been described is a probabilistic mixed-content page layout model 202' that in one example extends a corresponding model 202 to also accommodate contextual advertisements 302 in addition to text blocks 104 and images 106. Generalized predesigned templates 204' are further input into the model 202', and include regions 406 for contextual advertisements 302, as generalized regions 408 that can be used for text blocks 104, images 106, or contextual advertisements 302. Contextual advertisements 302 are processed by the model 202' no differently than images 106 are, except that advertisements 302 have dynamic weightings instead of a common static weighting, and except that advertisements 302 are fixed in size, whereas images 106 can have their sizes adjusted by the model 202'. In these ways, an existing probabilistic mixed-content page layout model 202 can thus be modified or extended in one example to yield the model 202' to accommodate contextual advertisements 302.

Figure 5:
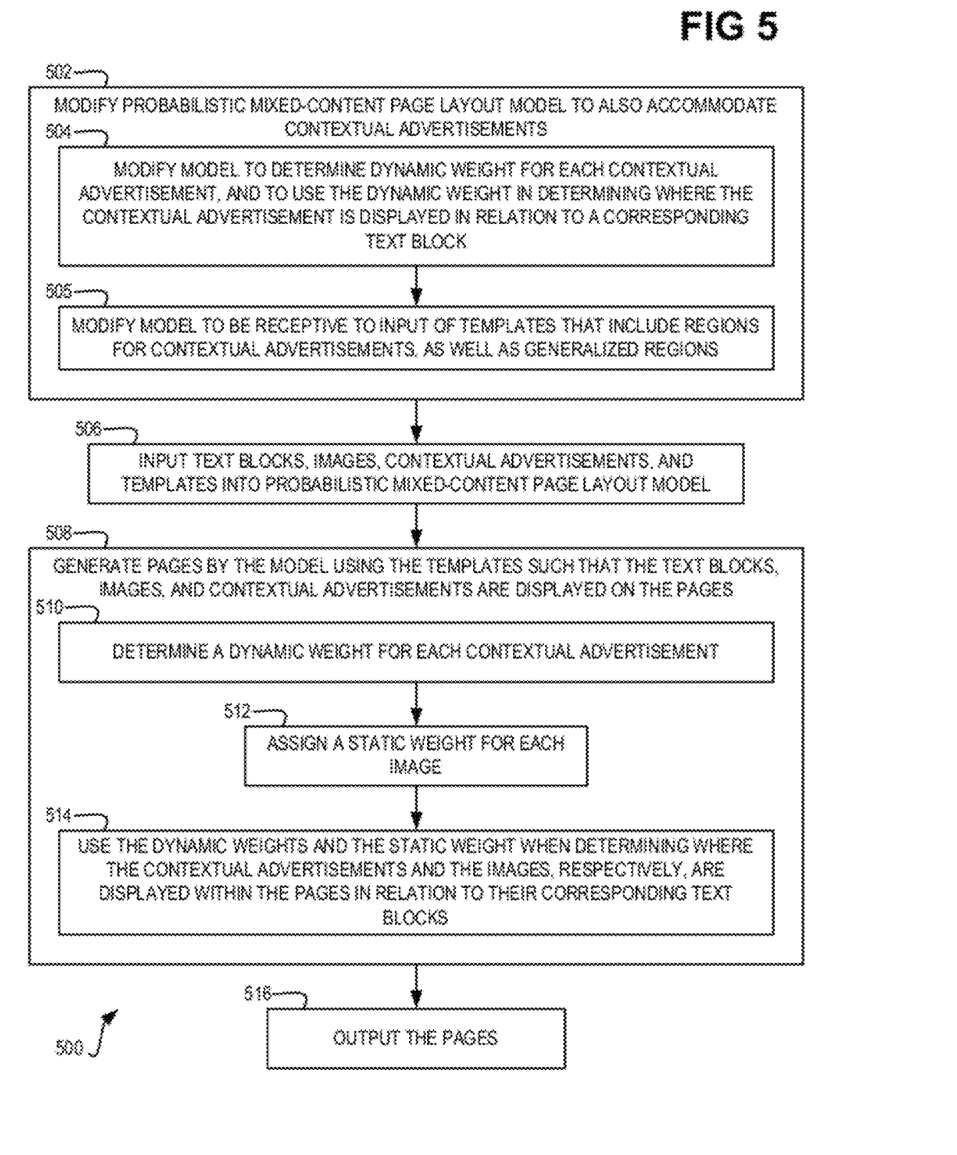
FIG. 5 is a flowchart of a method for using a probabilistic mixed-content page layout model that accommodates contextual advertisements, according to an example of the disclosure.

FIG. 5 shows a method 500, according to an example of the disclosure. As with other methods of other examples of the disclosure, at least some parts of the method 500 can be implemented by one or more computer programs stored on a non-transitory computer-readable data storage medium, such as a magnetic medium like a hard disk drive, or a semiconductor medium like a flash memory or a dynamic random-access memory. A processor of a computing device thus executes the computer programs to cause at least some parts of the method 500 to be performed.

First, the probabilistic mixed-content page layout model 202 that has been referred to can be modified to accommodate contextual advertisements 302 in addition to text blocks 104 and images 106 (502), resulting in the probabilistic mixed-content page layout model 202'. That is, the model 202 is modified so that it displays on the pages 108 the contextual advertisements 302, in addition to the text blocks 104 and the images 106. In particular, the model 202 is modified so that it will determine a dynamic weight for each contextual advertisement 302, and so that the model 202 will use this dynamic weight when determining where the contextual advertisement is displayed in relation to the text block 104 to which the advertisement 302 corresponds (504).

In this respect, the manner by which the model 202 lays out images 106 is extended to lay out contextual advertisements 302 as well. The difference is, as noted above, that the contextual advertisements 302 are laid out in accordance with dynamic weights, whereas the images 106 are laid out in accordance with at least an implicit common static weight. Furthermore, the probabilistic mixed-content page layout model 202 is modified so that it is receptive to input and use of generalized predesigned templates 204' that include one or more regions 406 for contextual advertisements 302 and one or more generalized regions 408, as described above, in addition to the regions 402 and 404 for text blocks 104 and images 106 (505).

One or more text blocks 104, one or more images 106, one or more contextual advertisements 302, and one or more generalized predesigned templates 204' are then input into the probabilistic mixed-content page layout model 202' (506). The model 202' then generates pages 108 using the templates 204', such that the text blocks 104, the images 106, and the contextual advertisements 302 are displayed on the pages 108 (508). The manner by which the model 202' generates the pages 108 can be as is achieved in the two pending patent applications referenced above, where the model 202' extends the model 202 to accommodate the placement of the advertisements 302 on the pages 108, as has been described above.

More specifically, the method 500 determines a dynamic weight for each contextual advertisement 302 (510), and assigns a common static weight for the images 106 (512). Thereafter, the dynamic weights and the static weight are used by the probabilistic mixed-content page layout model 202' when determining where the contextual advertisements 302 and the images 106, respectively, are displayed within the pages 108 in relation to their corresponding text blocks 104 (514). As noted above, the dynamic weight for each contextual advertisement 302 may be based on a number of different factors. These factors include but are not limited to the relevance of the advertisement 302 to its corresponding text block 104; the bid price that an advertiser has bid for a keyword found in the text block 104; the relatedness between the advertisement 302 and the user that is to view the pages 108; and, the relatedness between the advertisement 302 and the location of this user.

The generated pages 108 are then output (516). For example, the pages 108 may each be successively displayed on an electronic display having a display. The pages 108 are displayed such that scrolling is unnecessary to view each page 108 completely on the display. As another example, the pages 108 may each be printed on a medium sheet by a printing device. The pages 108 are printed so that each page 108 is completely printed on one such sheet and does not extend over multiple sheets.

Figure 6:
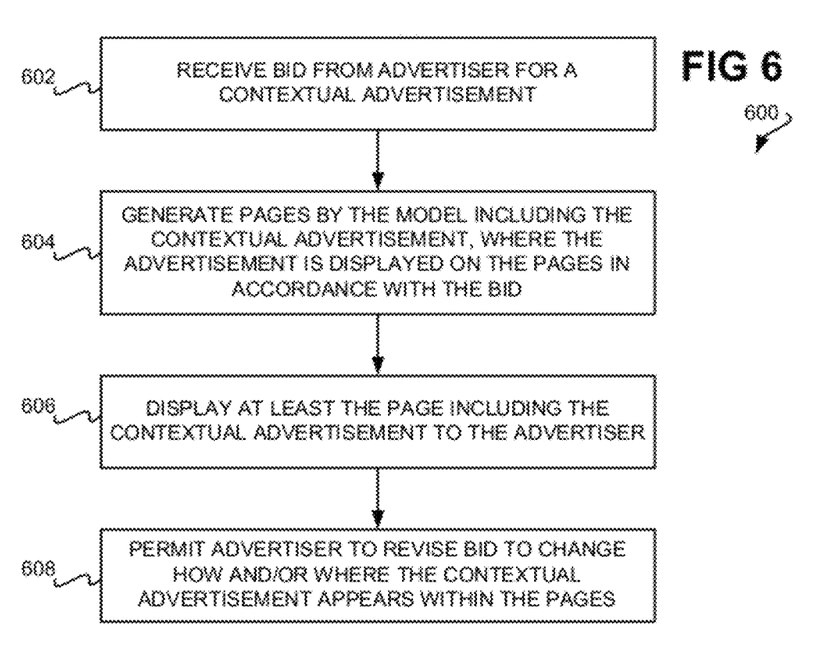
FIG. 6 is a flowchart of a method for how a probabilistic mixed-content page layout model that accommodates contextual advertisements can be used by advertisers during a bidding process, according to an example of the disclosure.

FIG. 6 shows a method 600, according to another example of the disclosure. The method 600 illustrates how the probabilistic mixed-content page layout model 202' that has been described can be used also to potentially increase the bid amounts that advertisers are willing to pay for their contextual advertisements 302 to be displayed near corresponding text blocks 104. A bid is received from an advertiser for a contextual advertisement 302 for a keyword present in one of the text blocks 104 (602).

The probabilistic mixed-content page layout model 202' then generates the pages 108, including this contextual advertisement 302, such that this advertisement 302 is displayed on the pages 108 based on the bid (604). At least the page 108 including the contextual advertisement 302 is displayed to the advertiser (606). The advertiser is thus permitted to revise his or her bid to change how and/or where the contextual advertisement 302 appears within the pages 108 that will be displayed to a user (608).

For example, an advertiser may initially bid five dollars for placing his or her contextual advertisement 302 on pages 108 that contain a text block 104 including a keyword to which the advertisement 302 is related. After the advertiser has viewed the page 108 that has been generated and that includes the contextual advertisement 302 in question, the advertiser may conclude that the advertisement 302 is not placed sufficiently close to the text block 104 in question as the advertiser would like. Therefore, the advertiser may increase the bid amount to ten dollars, to determine whether this increased bid results in his or her contextual advertisement 302 appearing closer to the desired text block 104.

Figure 7:
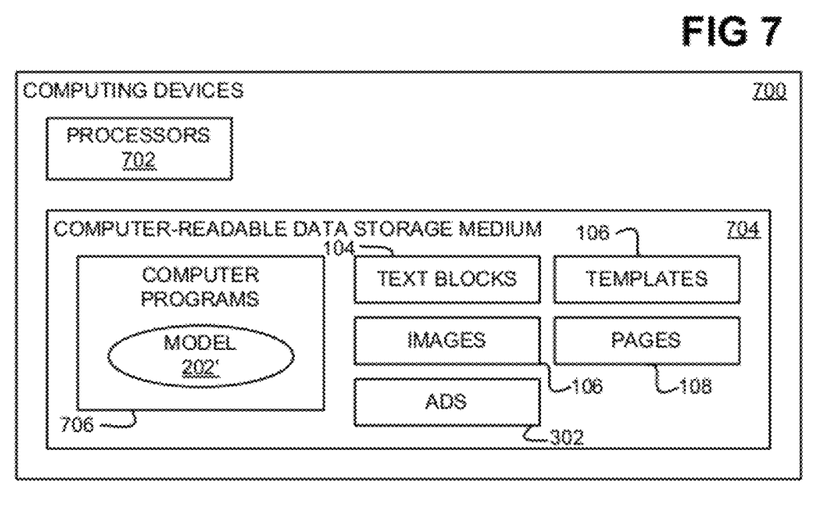
FIG. 7 is a diagram of a system using a probabilistic mixed-content page layout model that accommodates contextual advertisements, according to an example of the disclosure.

In conclusion, FIG. 7 shows a system implemented as one or more computing devices 700, according to an example of the disclosure. The computing devices 700 include hardware such as one or more processors 702 and a computer-readable data storage medium 704. The computing devices 700 can and typically will include other hardware as well, in addition the processors 702 and the data storage medium 704.

The computer-readable data storage medium 704 stores one or more computer programs 706 that implement the probabilistic mixed-content page layout model 202'. The data storage medium 704 further stores the text blocks 104, the images 106, and the contextual advertisements 302 that are input into the model 202'. The data storage medium 704 also stores the generalized predesigned templates 204' that are input into the model 202', and stores the pages 108 that are output by the model 202'.

Therefore, execution of the computer programs 706 by the processors 702 from the computer-readable data storage medium 704 causes the probabilistic mixed-content page layout model 202' to receive the text blocks 104, the images 106, the contextual advertisements 302, and the generalized predesigned templates 204' as input. On the basis of this input, the model 202' generates the pages 108 as output. The model 202' generates the pages 108 as has been described above, such in accordance with the method 500 of FIG. 5.

It is noted that embodiments of the disclosure have been described in relation to a mixed-content page layout model that is a probabilistic mixed-content page layout model. However, more generally, the disclosure pertains to any type of mixed-content page layout model. For example, such a model may receive text blocks, images, and contextual advertisements, and decide where to place such mixed content on one or more pages, but in a non-probabilistic manner. In such an example, the contextual advertisements are still dynamically weighted to corresponding text blocks as has been described above, even though the resulting determination as to where to place the contextual advertisements on the pages is achieved non-probabilistically.

I claim:

1. A non-transitory computer-readable data storage medium having a computer program stored thereon, wherein execution of the computer program by a processor causes a method to be performed, the method comprising:
    inputting one or more text blocks, one or more images, and one or more contextual advertisements related to the text blocks into a mixed-content page layout model, the mixed-content page layout model being a probabilistic mixed-content page layout model;
    probabilistically generating one or more pages by the mixed-content page layout model to determine where the text blocks, the images, and the contextual advertisements are placed on the pages, including treating the contextual advertisements differently than the images when determining sizes thereof and where to place the text blocks, the contextual advertisements, and the images on the pages; and
    outputting the pages.

2. The non-transitory computer-readable data storage medium of claim 1, wherein determining the dynamic weight for the contextual advertisement in relation to the particular text block is based on one or more of:
    a relevance of the contextual advertisement to the particular text block;
    a bid price that an advertiser of the contextual advertisement has bid for a keyword found in the particular text block.

3. The non-transitory computer-readable data storage medium of claim 1, wherein the method further comprising inputting a plurality of probabilistic page layout templates into the probabilistic mixed-content page layout model,
    wherein the probabilistic mixed-content page layout model generates each page using one of the probabilistic page layout templates,
    wherein at least one of the probabilistic page layout templates comprises one or more of:
        a first region to which only a contextual advertisement can be assigned;
        a second region to which a text block or an image, but not a contextual advertisement, can be assigned; and,
        a third region to which a text block, an image, or a contextual advertisement can be assigned.

4. The non-transitory computer-readable data storage medium of claim 1, wherein generating the one or more pages by the mixed-content page layout model comprises:
    assigning a common static weight for each image in relation to a particular text block, the mixed-content page layout model using the common static weight in determining where each image is displayed within the one or more pages in relation to the particular text block.

5. The non-transitory computer-readable data storage medium of claim 1, wherein outputting the pages comprises one of:
    displaying each page on an electronic device having a display, each page having a size corresponding to no greater than a size of the display so that each page is completely displayable on the display such that scrolling through each page is unnecessary to view each page completely on the display;
    printing each page on a medium sheet by a printing device, each page having a size corresponding to no greater than a size of the medium sheet so that each page is completely printed on one medium sheet, and so that each page does not extend over multiple medium sheets.

6. The non-transitory computer-readable data storage medium of claim 1, wherein the method further comprises:
    receiving a bid from an advertiser of a particular contextual advertisement for a keyword present in one of the text blocks;
    after generating the one or more pages by the mixed-content page layout model,
        displaying a page including the particular contextual advertisement and a page including the text block having the keyword, to the advertiser;
    permitting the advertiser to revise the bid so that the particular contextual advertisement appears closer to the text block having the keyword within the pages.

7. The non-transitory computer-readable data storage medium of claim 1, wherein the probabilistic mixed-content page layout model is a page layout model in that the probabilistic mixed-content page layout model lays out the text blocks, the images, and the contextual advertisements on the pages,
    wherein the probabilistic mixed-content page layout model is a mixed-content model in that the probabilistic mixed-content page layout model lays out mixed content on the pages, the mixed content including the text blocks, the images, and the contextual advertisements, and wherein the probabilistic mixed-content page layout model is a probabilistic model in that the probabilistic mixed-content page layout model is a priori non-deterministic and uses probabilities in determining which text blocks, which images, and which contextual advertisements are displayed on each page, and in determining how the text blocks, the images, and the contextual advertisements of each page are displayed on the page.

8. The non-transitory computer-readable data storage medium of claim 1, wherein each contextual advertisement is contextual in that the contextual advertisement is related to a keyword found in one of the text blocks.

9. The non-transitory computer-readable data storage medium of claim 1, wherein each image comprises one of a static image and a moving image.

10. A method comprising:
  modifying a mixed-content page layout model that is to display one or more text blocks and one or more images on one or more pages to also display one or more contextual advertisements on the pages, the mixed-content page layout model being a probabilistic mixed-content page layout model;
  inputting, by a processor, the text blocks, the images, and the contextual advertisements into the mixed-content page layout model as has been modified;
  probabilistically generating the pages by the mixed-content page layout model as executed by the processor, to determine where the text blocks, the images, and the contextual advertisements are placed on the pages, including treating the contextual advertisements differently than the images when determining sizes thereof and where to place the text blocks, the contextual advertisements, and the images on the pages; and,
  outputting the pages.

11. The method of claim 10, wherein modifying the mixed-content page layout model to determine the dynamic weight for each contextual advertisement in relation to the particular text block comprises modifying the mixed-content page layout model so that the mixed-content page layout model determines the dynamic weight for each contextual advertisement based on one or more of:
  a relevance of the contextual advertisement to the particular text block;
  a bid price that an advertiser of the contextual advertisement has bid for a keyword found in the particular text block.

12. The method of claim 10, wherein the mixed-content page layout model is probabilistic mixed-content page layout model,
  wherein modifying the probabilistic mixed-content page layout model to also display the contextual advertisements on the pages further comprises modifying the probabilistic mixed-content page layout model to receive as input a plurality of probabilistic page layout templates,
  wherein the probabilistic mixed-content page layout model is to generate each page using one of the probabilistic page layout templates,
  wherein at least one of the probabilistic page layout templates comprises one or more of:
    a first region to which only a contextual advertisement can be assigned;
    a second region to which a text block or an image, but not a contextual advertisement, can be assigned; and,
    a third region to which a text block, an image, or a contextual advertisement can be assigned.

13. A system comprising:
  a processor;
  a computer-readable data storage medium to store one or more computer programs executable by the processor and implementing a probabilistic mixed-content page layout model,
  wherein the probabilistic mixed-content page layout model is to generate one or more pages to determine where one or more text blocks, one or more images, and one or more contextual advertisements are placed on the pages, the model treating the contextual advertisements differently than the images when determining sizes thereof and where to place the text blocks, the contextual advertisements, and the images on the pages.

14. The system of claim 13, wherein the probabilistic mixed-content page layout model is further to receive as input a plurality of probabilistic page layout templates,
  wherein the probabilistic mixed-content page layout model is to generate each page using one of the probabilistic page layout templates,
  wherein at least one of the probabilistic page layout templates comprises one or more of:
    a first region to which only a contextual advertisement can be assigned;
    a second region to which a text block or an image, but not a contextual advertisement, can be assigned; and,
    a third region to which a text block, an image, or a contextual advertisement can be assigned.

15. The non-transitory computer-readable data storage medium of claim 1, wherein treating the contextual advertisements differently than the images when determining sizes thereof and where to place the text blocks, the contextual advertisements, and the images on the pages comprises:
  resizing at least one of the images when determining where to place the text blocks, the contextual advertisements, and the images on the pages; and
  maintaining preset sizes of all the contextual advertisements when determining where to place the text blocks, the contextual advertisements, and the images on the pages.

16. The non-transitory computer-readable data storage medium of claim 1, wherein treating the contextual advertisements differently than the images when determining sizes thereof and where to place the text blocks, the contextual advertisements, and the images on the pages comprises:
  determining a dynamic weight for each contextual advertisement in relation to each text block, each dynamic weight specifying how related a given contextual advertisement is to a given text block;
  assigning a static weight for each image in relation to each text block, each static weight specifying whether or not a given image is maximally related to a given text block; and
  using the dynamic weights for the contextual advertisements and the static weights for images when determining where to place the text blocks, the contextual advertisements, and the images on the pages.

17. The non-transitory computer-readable data storage medium of claim 1, wherein treating the contextual advertisements differently than the images when determining sizes thereof and where to place the text blocks, the contextual advertisements, and the images on the pages comprises:

determining a dynamic weight for each contextual advertisement in relation to each text block, each dynamic weight specifying how related a given contextual advertisement is to a given text block;

assigning a static weight for each image in relation to each text block, each static weight specifying whether or not a given image is maximally related to a given text block;

using the dynamic weights for the contextual advertisements and the static weights for images when determining where to place the text blocks, the contextual advertisements, and the images on the pages;

resizing at least one of the images when determining where to place the text blocks, the contextual advertisements, and the images on the pages; and     maintaining preset sizes of all the contextual advertisements when determining where to place the text blocks, the contextual advertisements, and the images on the pages.

\* \* \* \* \*